250-203.R

56

April 5, 1966 J. S. ZUCKERBRAUN 3,244,886

LIGHT MODULATION SYSTEM FOR PHOTOSENSITIVE TRACKING DEVICE

Filed Aug. 5, 1960 3 Sheets-Sheet 1

INVENTOR.
JACOB S. ZUCKERBRAUN

BY

OSTROLENK, FABER, GERB & SOFFEN

ATTORNEYS

INVENTOR.
JACOB S. ZUCKERBRAUN
BY
OSTROLENK, FABER, GERB & SOFFEN
ATTORNEYS

INVENTOR.
JACOB S. ZUCKERBRAUN
BY
OSTROLENK, FABER, GERB & SOFFEN
ATTORNEYS 3,244,886

LIGHT MODULATION SYSTEM FOR PHOTO-SENSITIVE TRACKING DEVICE

Jacob S. Zuckerbraun, New York, N.Y., assignor to Kollsman Instrument Corporation, Elmhurst, N.Y., a corporation of New York Filed Aug. 5, 1960, Ser. No. 47,837
9 Claims. (Cl. 250—203)

This invention relates to light modulation systems and more particularly relates to improvements in shutter arrangements for light tracking devices.

The invention system is in the nature of an improvement of the shutter mechanism and light modulation system shown and described in U.S. Patent 2,905,828 to J. B. O'Maley et al. for Light Tracking Device assigned to the same assignee as the present invention. A light tracking device is essentially utilized for navigational purposes and is provided with an optical system adapted to transmit an image of a celestial object such as stars, the sun or the moon to means which will seek to operate the optical system to maintain the image in the center of the field of view. The movements of the optical system may then be translated into corresponding movements of operating or adjusting members for craft guidance instruments or devices.

The background of the field of view is frequently illuminated in conjunction with the celestial body to be tracked. The aforesaid patent application discloses a light tracking device having a double modulation system for the light impinging thereon, arranged to minimize errors caused by the background lighting. The double light modulating mechanism comprises a rotating disc having a raster of alternate opaque and transparent areas interrupting the field of view to the light sensitive medium, such as a photoelectric cell. A semi-circular shutter was used to further interrupt the light beam in the field of view at a lower frequency than that produced by the raster.

Such double modulation of the field of view substantially eliminates errors due to background illumination entering the system in conjunction with light from the celestial body to be tracked. Circuit arrangements and means are provided in the referred to patent application to detect the directional information from the desired celestial body and translating such information as signals which automatically are effective in the light tracking device for predetermined orientations or operation.

In accordance wtih the present invention, an aperture carried in a plate is moved through the star image with simple harmonic motion. The aperture is approximately equal to the diameter of the star image.

In a preferred embodiment of the invention, the aperture is placed in a plate which is carried by a thin magnetic reed. The magnetic reed may then be driven by a generator of alternating magnetic flux, such as a small solenoid which is excited at the desired scanning frequency. The aperture will, therefore, oscillate about a null position with a sinusoidal displacement. The maximum excursion from the null position is determined by the solenoid current and the total excursion is preferably of the order of three aperture diameters or more.

When a star image is to be tracked, where the star is a light source for the system, the star image when accurately located will be at a central position in the simple harmonic motion of the aperture. As the aperture is moved from side to side, the star image will be interrupted at twice the reed frequency. Thus, a beam of light may be directed at a photo-sensing device positioned behind the plate to generate a signal which is at twice the reed frequency. When, however, the star is moved away from the central position and along the line of oscillation, the light passing through the aperture and impinged upon the photo-sensing means, will have a fundamental frequency component which is equal to that of the frequency of oscillation of the reed. If the star moves off the central position and in an opposite direction, the phase of this fundamental component will be reversed.

Therefore, the output signal of the photo-sensing means carries information as to whether the star is located exactly at a central position, or whether the star is displaced from a central position and the direction of its displacement. This information can then be applied to a servomechanism using the teachings of the above noted U.S. Patent 2,905,828 in order to alter the direction of the telescope receiving the star image to return the star image to its central or null position.

With the present novel scanner, it is therefore possible to combine the highly desirable feature of a very small instantaneous field which is swept by the aperture to limit noise due to background light, as well as the ability to develop a continuous tracking signal. Because of these properties, the novel scanner permits more efficient tracking of stars at night as well as during daylight hours and further permits tracking of the sun during daylight hours.

Since the signal generated is a periodic signal, rather than a pulse which has been heretofore produced, narrow band amplifiers may be used at the output of the photo-sensing means to achieve a substantial decrease in the noise level.

Furthermore, the scanning mechanism is of an exceedingly simple construction and requires no motors or gear trains as have been required in the past. Along with this, the power requirement for driving the reed is exceedingly small and of the order of 0.5 milliwatt.

As an example of the effectiveness of the novel system, it has been possible to detect a second magnitude star in a background of 200 candles per square foot. In this experiment, the amplifiers used had a bandwidth of one cycle per second with the dynamic field swept by the aperture being approximately two by six minutes. The star image and reed aperture had a diameter of approximately four one thousandths of an inch which corresponds to a field of approximately 1.8 minutes. It was specifically possible with this apparatus to recognize Vega at an altitude of 40° with a signal to noise ratio of approximately 10, some fifteen minutes before sunset.

As a further embodiment of the invention, a two axis reed scanner can be utilized, where one axis corresponds to azimuth and the other axis, at right angles to the first axis, corresponds to altitude. In this embodiment, a single reed can be rotatably carried so as to alternately rotate first along a first axis and then along a second and perpendicular axis. As an alternative, two fixed reeds, carrying respective plates having narrow slits therein, can be used where the narrow slits are perpendicular to one another. These will form a square aperture where oscillation of a first of the reeds will cause movement of the square aperture in a first direction, while oscillation of a second of the reeds will cause movement of the square aperture in a perpendicular direction.

Accordingly, a primary object of this invention is to provide a novel scanning device for automatic light source locating instruments.

Another object of this invention is to provide a novel light scanning device which has a relatively small instantaneous field to considerably restrict background light and background modulation.

Another object of this invention is to provide a novel light scanning device for star trackers to generate a periodic star signal to permit the use of narrow band amplifier means.

A further object of this invention is to provide a novel scanning system for permitting continuous tracking of a star where the star signal undergoes a phase reversal when the star image moves from one side of the optical axis of the instrument to the other side of the optical axis of the instrument.

Another object of this invention is to provide a novel scanning system which generates a double frequency to maintain a star presence indication.

Another object of this invention is to provide a novel star tracking system which includes an aperture moved with simple harmonic motion across a star image and has a field of the order of three star image diameters.

A further object of this invention is to provide a novel scanning system for light sources which has a low power requirement of the order of 0.5 milliwatt.

These and other objects of my invention will become more apparent from the following description of an exemplary embodiment thereof, illustrated in the drawings, in which.

Figure 1:
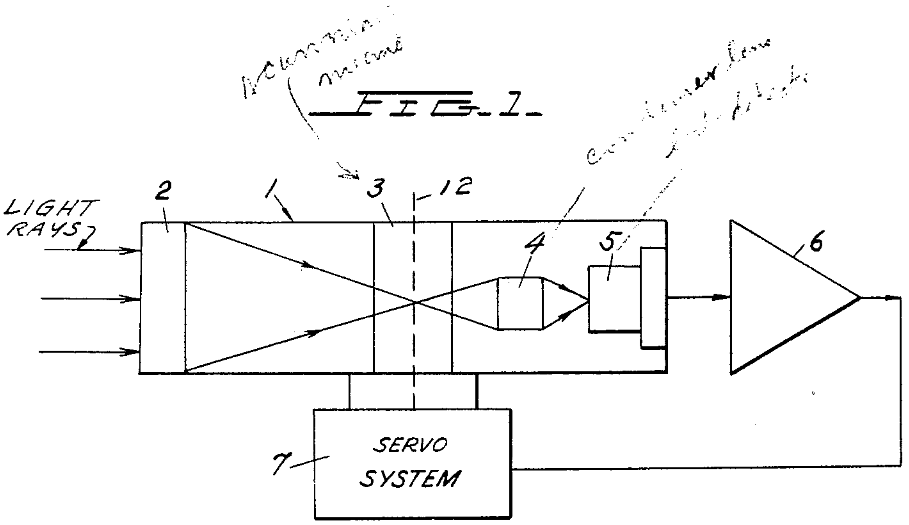
FIGURE 1 shows a block diagram of a typical star tracker which can utilize the scanning means of the present invention.

Referring now to FIGURE 1, I show a schematic diagram of a light source tracking member where light rays from the celestial body to be tracked are collected by a telescope objective 2 of telescope housing 1 and are focused on the proposed scanning mechanism 3. The scanning mechanism 3 modulates the light in a novel way to be described later.

The modulated light from the scanner 3 is collected by the condensing lens system 4 and is concentrated on a light sensing means or light detector 5 which can be a photomultiplier tube. The signal from the light sensing means 5 is amplified and processed by the narrow-band amplifier and circuitry 6 and then transmitted to the servomechanism 7. By means of these actuating signals, the servomechanism 7 guides the telescope housing 1 so that it aligns itself precisely with the star in altitude and azimuth.

Figure 3:
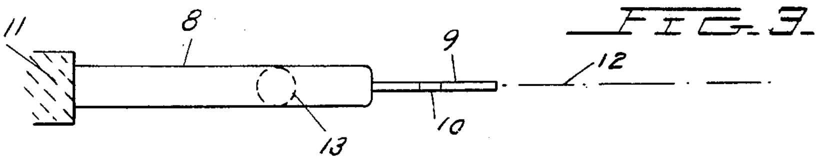
FIGURE 3 shows a top view of FIGURE 2.
Figures 2, 6:
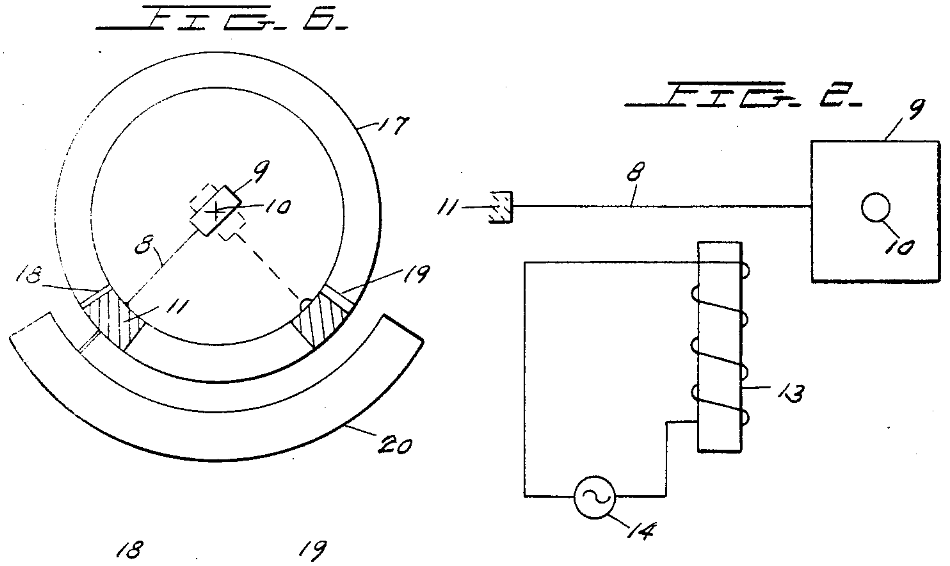
FIGURE 2 shows a front view of a reed scanner formed in accordance with the present invention.
FIGURE 6 shows a top view of a two axis scanning mechanism.

The novel scanning mechanism 3 is described in detail in FIGURES 2 and 3. The scanner is comprised of a vibrating element such as the magnetized reed 8 carrying a thin flat plate 9 in which a small aperture 10 is bored. The aperture plate 9 is constrained by the reed which has its opposite end mounted to fixed member 11 so that plate 9 moves only in the focal plane 12 (FIGURE 3) of the telescope 1 of FIGURE 1. When the reed 8 is at rest, the aperture 10 will be located so that its center lies on the optic axis of the telescope. This position will be referred to as the null or central position.

A reed coil 13 is then positioned adjacent reed 8 so that when the reed coil 13 is excited by a constant frequency current source 14, the reed 8 will vibrate with a simple harmonic motion about its rest position at the frequency of the exciting current. The aperture 10, therefore, will be given a sinusoidal displacement about the null position at the frequency of the reed oscillation. If the excitation current to coil 13 is at the resonant frequency of the reed, very little power will be required to keep the reed in continuous oscillation.

The diameter of aperture 10 is chosen approximately equal to the image diameter of the light source to be tracked such as a star. The coil current is adjusted to give the aperture a peak-to-peak swing of the order of four star image diameters. The aperture 10, therefore, sweeps out a small dynamic field about four times long as it is wide.

Figure 4:
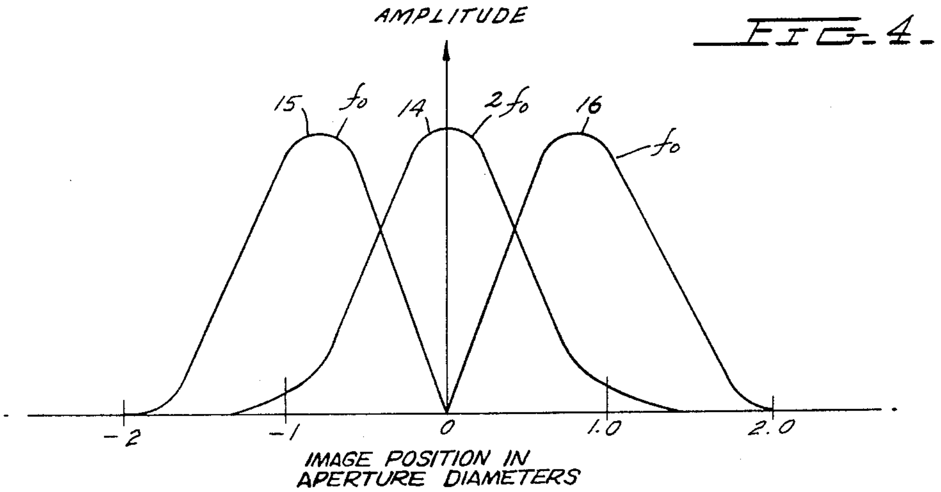
FIGURE 4 shows output voltages developed by the photo-sensing means when using the scanning device of the present invention.

In operation, when the star image is focused at the null position, as the aperture vibrates, the star radiation will be interrupted twice during each cycle of the reed, causing a periodic signal to be developed by the light sensor. The fundamental component of this signal is equal to twice the reed frequency, and is shown on curve 14 in FIGURE 4. Curve 14, in FIGURE 4, shows the amplitude of the second harmonic $(2f_0)$ as a function of the image position for a constant image intensity. This signal is used to indicate that the star is lined up precisely with the telescope axis.

If the star is now moved off null along the line of vibration, then a periodic signal having a fundamental component equal to the reed frequency will be developed as shown by curve 15 of FIGURE 4. This fundamental component gradually increases in amplitude from zero to a maximum and then decreases again as the star departs further from null. If the star image is moved off null in a direction opposite to that described, the amplitude variations will be as before, as shown in curve 16 of FIGURE 4, but the phase of the fundamental will reverse. The phase relationship of the outputs of curves 15 and 16 of FIGURE 4 is given in FIGURE 5 which shows phase on the vertical axis as compared to image position on the horizontal axis plotted in aperture diameters. Therefore, these signals can be used to servo the telescope 1 by servo 7 as well as for recognition.

Figure 7:
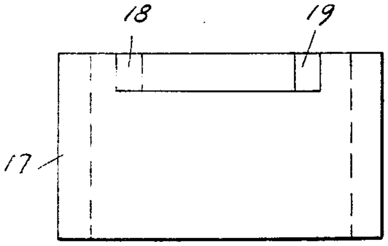
FIGURE 7 shows a side view of the bearing of FIGURE 6.

From the above it is seen that the motion of aperture 10 establishes a single axis along which a star can be tracked to null. Since two axes at right angles to each other are generally desirable, the basic concept of a vibrating scanning aperture can be expanded to two axes. A first embodiment of a two axes device is shown in FIGURES 6 and 7 where a bearing 17 has two stop faces 18 and 19 located 90° apart. The reed 8, together with its exciting coil (not shown), are of the type described in FIGURES 2 and 3 and are supported so that they can be rotated along the bearing surfaces from one stop to the other by means of a solenoid-operated mechanism 20 which can be of any desired nature and carries mounting base 11. Clearly, when the reed mechanism is located against face 18, the aperture will establish an azimuth axis, and when the reed mechanism is located against face 19, the aperture motion will establish an altitude axis.

Figure 8:
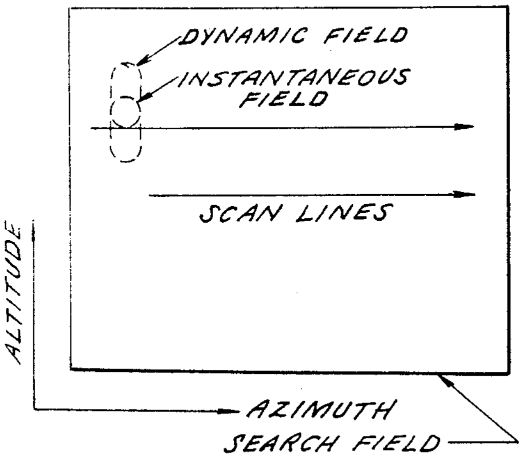
FIGURE 8 shows the search field, dynamic field and instantaneous field for operation of the two axis scanning mechanism of FIGURES 6, 7 and 11 when driven along a first of the axes.
Figure 9:
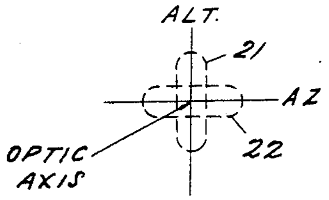
FIGURE 9 shows the relation between the two dynamic fields swept by the device of FIGURES 6 and 7.

With the device of FIGURES 6 and 7, the tracking of a star may be accomplished by alternately tracking in altitude and azimuth. The tracking process will then be programmed as follows: the vibrating reed base 11 is positioned in the solid line position of FIGURE 6 by the solenoid mechanism 20 so that the aperture vibrates along the altitude axis. This is shown in FIGURE 8 where the instantaneous field of aperture 10 sweeps a dynamic field within a search field. At the same time, the telescope positioning servo 7 of FIGURE 1 causes the telescope 1 of FIGURE 1 to sweep in azimuth along the scan lines of FIGURE 8 through an angle equal to the width of the search field. Once the recognition signal is generated, the search stops, and alternate tracking in altitude and azimuth commences as shown in FIGURE 9 where aperture 10 first sweeps the altitude dynamic field 21 with base 11 of FIGURE 6 in its solid line position and then sweeps the azimuth dynamic field 22 of FIGURE 9 with base 11 of FIGURE 6 in its dotted line position. The same process given above applies to sun and moon tracking except that the reed excitation is increased to produce a dynamic field somewhat larger than the image of the celestial body.

Figure 5:
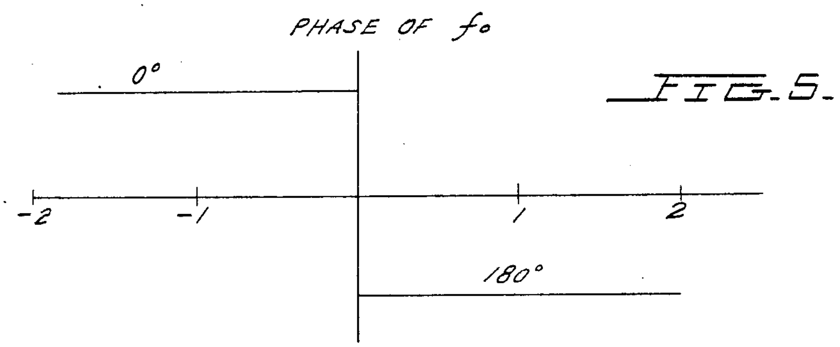
FIGURE 5 shows the phasing of the signal output of the photo-sensing device when used with the scanner of the present invention.

As an alternative to the use of an oscillating aperture, a small semi-conductor photocell may be used in place of the aperture. In this case, when the reed vibrates, the photocell, having an effective area equal to the aperture previously described, will scan the field in an oscillatory manner as before. This eliminates the condensing lens system 4 and the photomultiplier tube 5, together with any possible cathode gradient effects. The form of the signals derived will remain as indicated in FIGURES 4 and 5 so that associated circuit components remain essentially unchanged.

Figure 10:
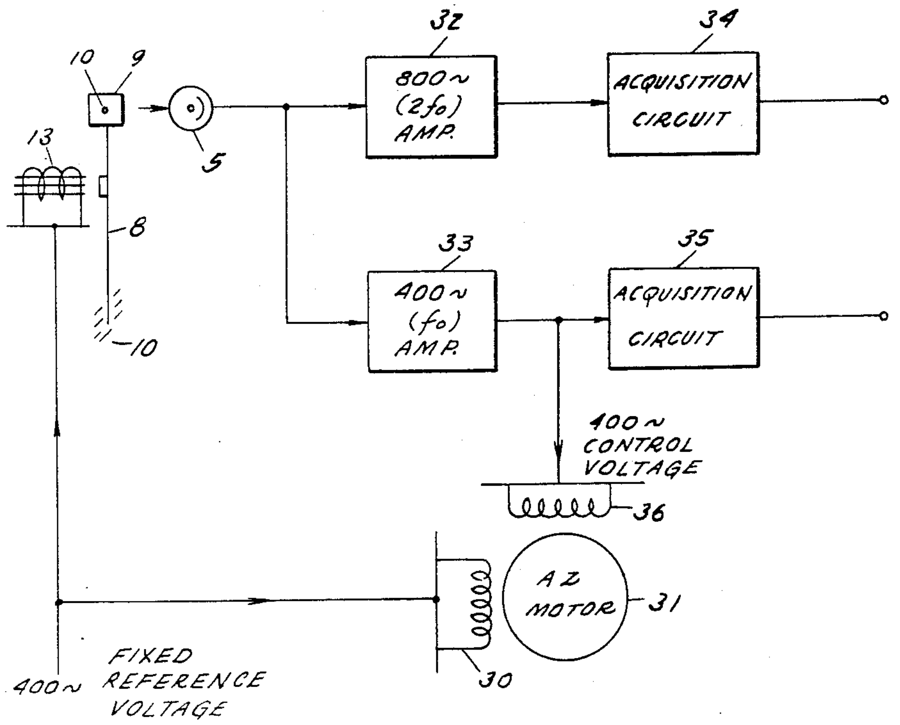
FIGURE 10 is a line diagram showing the azimuth portion of the electrical circuitry of a device having the scanning mechanism of FIGURES 6 and 7.
Figure 11:
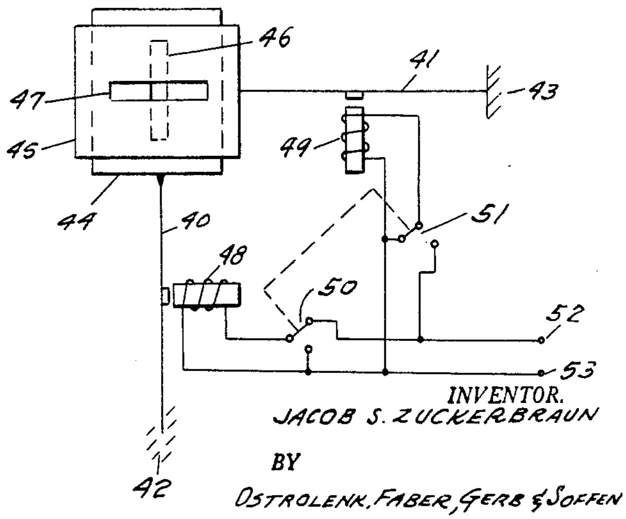
FIGURE 11 illustrates the manner in which two permanently mounted vibrating reeds can be used for two axis scanning.

The electrical circuitry for use with the method of star tracking proposed for the scanners of FIGURES 6 and 11 is schematically shown in FIGURE 10 where, for simplicity, only the azimuth loop is shown.

Referring now to FIGURE 10, a 400 cycle input voltage is connected to drive coil 13 for oscillating reed 8 and is also connected to a fixed field winding 30 of azimuth control motor 31 of the servomechanism 7 of FIGURE 1. As aperture 10 is swept through its field, the light transmitted thereby is impinged on the light sensing means 5 shown for example as a photomultiplier in FIGURE 10, which can be of the type 1P21. The output of photomultiplier 5 is connected to an 800 cycle tuned amplifier 32 and a 400 cycle tuned amplifier 33. The outputs of these two amplifiers are connected to acquisition control circuits 34 and 35, respectively, which have outputs connected in any desired manner to drive the servomechanism elements in order to maintain the 800 cycle double frequency output of tube 5. This, of course, will be the output frequency of photomultiplier tube 5 when the star image is at a null position or a central position since reed 8 is oscillated at a frequency of 400 cycles.

The 400 cycle amplifier 33 will receive signals when the star image moves off the null position as has been described previously. The amplifier 33 is, therefore, connected to control field winding 36 of servo motor 31 where this winding will be energized by an excursion of the star image from null, the phase of the energization being dependent upon the sense of the excursion.

Accordingly, azimuth control motor 31 will operate to reposition the azimuth of telescope 1 of FIGURE 1 to maintain the proper azimuth angle for retaining the star image at null.

In the event that aperture 10 is replaced by a semiconductor type of photosensing element, it is clear that the output of the element is directly connected to amplifiers 32 and 33, the operation being identical to that described above.

It will be further apparent that the altitude control system will be identical to that described in FIGURE 10 for the azimuth control system.

The following advantages flow from the use of my novel scanning mechanism. These advantages are listed as follows:

(1) The device allows the use of a scanning aperture equal to the star image diameter. This results in a maximum photon signal-to-noise ratio.

(2) The device produces a periodic star signal, thereby permitting the use of narrow-band amplifiers to reduce the noise fluctuations in the signal.

(3) The signals developed by the scanner are suitable for continuous positioning and recognition.

(4) Background modulation caused by sky and phototube gradients are kept low because the aperture motion is very small.

(5) The scanner itself cannot generate a spurious background signal because the aperture presents a fixed area to the background illumination.

(6) The scanning mechanism does not require the use of motors or gears and therefore has a very long life. This minimizes weight and keeps the power requirements to less than 500 microwatts.

(7) The dynamic field can be from three to four times the instantaneous field of the aperture, thus permitting fewer search lines than for a non-vibratory scanning aperture.

(8) The accuracy of tracking is high because star signals are generated within the Airy disc of the star image, and the aperture position can be more accurately controlled than in a rotary device.

(9) The electronics associated with the scanner tends to be simple. The star signal can be a 400 cycle signal either 90° or 270° out of phase with the servo motor reference, depending upon the star position with respect to null. Therefore, the tracking motors operate as synchronous detectors for star positioning.

Figure 12:
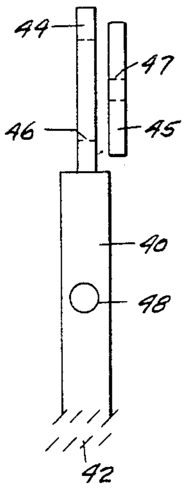
FIGURE 12 is a side view of a portion of the slit carrying plates of FIGURE 11.

An alternative method of forming a two axis scanner, as set forth in FIGURES 11 and 12, where two reeds 40 and 41 are stationarily mounted with respect to one another at stationary mounts 42 and 43, respectively, and are terminated by plates 44 ad 45 respectively. Plates 44 and 45 have elongated slits 46 and 47 respectively therein at right angles to one another to define a square aperture. Reed 40 is oscillated as described previously, by a solenoid coil 48, while reed 41 is oscillated by coil 49.

In a preferred embodiment for daylight tracking, the width of each of narrow slits 46 and 47 is approximately one start image diameter and the length of the slits is approximately seven diameters. It has been found that the plates 44 and 45 may have a clearance of approximately three one thousandths of an inch between one another.

The slit 46 is caused to oscillate so that the square aperture operates in the azimuth mode, while plate 45 is retained stationary at this time. Conversely, slit 47 is oscillated to define the altitude mode of operation, while plate 44 is retained stationary. However, since the reeds can be independently controlled, other scanning patterns appropriate to the aperture dimensions and tracking application can be readily produced.

The operation or manner in which the square aperture ultimately drives the servomechanism for operating telescope 1 of FIGURE 1, is the same as has been described above. The excitation for coils 48 and 49 is derived from a circuit which includes ganged switches 50 and 51. The excitation voltage applied to terminals 52 and 53 will, therefore, be applied only to one of the solenoids 48 or 49. When the solenoid is to be de-energized, its respective control switch will move to a short-circuiting position to damp the operation of the corresponding reed.

All of the advantages given for the scanning device of FIGURE 6 will be seen to be equally applicable to the devices of FIGURES 11 and 12. In addition, the devices of FIGURES 11 and 12 eliminates the requirement for solenoid means 20 of FIGURE 6 which changes the position of reed mounting means 11.

In the daylight tracking device, the slot size of one image diameter is the preferred size. Also depending on the application of the device the field size may correspond to one hundred image diameters.

Where the wide field or slot is used in the two reed embodiment, it will be understood that the two reeds can be simultaneously energized in quadrature to obtain a circular motion of the square aperture. In this case, the null frequency is $4f_0$ rather than $2f_0$ for alternate linear scanning.

Although I have described preferred embodiments of my novel invention, many variations and modifications will now be obvious to those skilled in the art, and I prefer therefore to be limited not by the specific disclosure herein but only by the appended claims.

I claim:

1. A scanning device for light source tracking devices; said scanning device comprising a plate having a single aperture therein and a driving means connected to said plate; said drive means oscillating said plate about a central position with simple harmonic motion at a predetermined frequency of oscillation; said tracking device including means for directing an image of the light source to be tracked by said scanning device toward said plate and a light sensing means; said plate being interposed between the light source being tracked and said image directing means; said driving means moving said aperture along a line to cause intermittent registry with said image of said light source to permit intermittent impingement of light on said light sensing means; said light sensing means generating a signal having a frequency equal to twice the frequency of oscillation of said plate when the center of said image is at said central position and generating a signal having a frequency equal to the frequency of oscillation of said plate as at least a portion thereof when said image is displaced from said central position.

2. The scanning device of claim 1 wherein said aperture has substantially the same size as the size of said image.

3. The scanning device of claim 2 wherein said driving means moves said plate in a total excursion of at least three diameters of said image.

4. The scanning device of claim 1 wherein said driving means includes a thin reed.

5. The scanning device of claim 4 wherein said thin reed is of magnetic material; said driving means further including a magnetic flux generating means for moving said thin reed of magnetic material with simple harmonic motion.

6. The scanning device of claim 1 wherein the phase of said fundamental frequency is dependent upon the sense of the displacement of said image from said central position.

7. The device of claim 6 which includes servo-mechanism means having the output of said light sensing means as an input signal; said servo-mechanism means being connected to said means for directing said image and varying the direction of said image to retain said image at said central position.

8. The device of claim 1 which further includes means for redirecting the motion of said plate for scanning along a second axis.

9. The scanning device of claim 5 wherein said driving means drives said reed at the resonant frequency of said reed.

References Cited by the Examiner

UNITED STATES PATENTS

| | | | |
|---|---|---|---|
| 1,565,596 | 12/1925 | Snook | 250—232 X |
| 2,155,402 | 4/1939 | Clark | 250—203 X |
| 2,406,800 | 9/1946 | Busignies | 250—232 X |
| 2,489,305 | 11/1949 | McLennan | 250—219 X |
| 2,713,134 | 7/1955 | Eckweiler | 250—203 X |
| 2,899,564 | 8/1959 | Rabinow et al. | 250—235 |
| 2,919,358 | 12/1959 | Marrison | 250—203 X |
| 2,966,823 | 1/1961 | Trimble | 250—203 X |
| 3,037,888 | 6/1962 | Lobosco et al. | 250—202 X |

RALPH G. NILSON, *Primary Examiner.*

RICHARD M. WOOD, *Examiner.*

W. STOLWEIN, *Assistant Examiner.*

UNITED STATES PATENT OFFICE

CERTIFICATE OF CORRECTION

Patent No. 3,244,886 April 5, 1966

Jacob S. Zuckerbraun

It is hereby certified that error appears in the above numbered patent requiring correction and that the said Letters Patent should read as corrected below.

Column 7, lines 15 and 16, for "image directing" read -- light sensing --.

Signed and sealed this 26th day of September 1967.

(SEAL)
Attest:

ERNEST W. SWIDER
Attesting Officer

EDWARD J. BRENNER
Commissioner of Patents